Dec. 16, 1969 L. E. RICHARDSON 3,484,587

APPARATUS FOR TRANSMISSION OF DATA

Filed Feb. 17, 1965

INVENTOR
LYMAN E. RICHARDSON

BY Fetherstonhaugh & Co.
ATTORNEYS 3,484,587
APPARATUS FOR TRANSMISSION OF DATA
Lyman Elmer Richardson, Dorval, Quebec, Canada, assignor to T-Scan Limited, Toronto, Ontario, Canada, a corporation of Canada
Filed Feb. 17, 1965, Ser. No. 433,264
Int. Cl. G06k 7/00; G08c
U.S. Cl. 235—61.11 24 Claims

ABSTRACT OF THE DISCLOSURE

A method of encoding information including a scanner for individually scanning selectable locations in columns of information to locate, in turn, each bit of information and a second scanner for determining when a further bit of further information is present in a first column and capable of causing the first scanner to scan the next column, when no further information is in said first group.

This invention relates to a method for encoding information for transmission over a channel to a receiver.

The invention has particular applicability to information recorded in the form of individual bits of information tabulated, i.e. arranged, in physical form (or arrangeable without loss of information) in columns similar to the arrangement of a matrix.

It has previously been proposed to provide a method and apparatus for encoding information recorded in the form of holes punched at various locations in a punched card and to scan each location by a main scanner unit either all at the same time as one group or as two groups, all the bits of information in any one group being scanned at the same time. It was then proposed to store each bit of information in coded form in an individual storage position in a storage device and to transmit each of the encoded bits of information in serial form one after the other. In the proposed apparatus, it was necessary to scan each of the succeeding locations in every column by means of the main scanner unit and to allow for a read-out from the corresponding storage positions even when there was no bit of information in succeeding locations in the respective column or in succeeding columns. Thus a considerable transmission time might be wasted in scanning succeeding locations which contained no information bit. This is, of course, a disadvantage.

From one aspect of the present invention, it is an object to provide a method of encoding information in which the above-mentioned disadvantage is reduced or substantially obviated so that there is less wastage of available transmission time.

According to this aspect of the invention, there is provided a method of encoding information for transmission over a channel to a receiver, the information comprising a plurality of bits of information arranged in selectable locations in groups, the groups being capable of arrangement in columns without loss of information, including the steps of: individually scanning the selectable locations in a group in a predetermined sequence to locate, in turn, each bit of information therein; scanning the same group to determine whether there is a furthur bit of said information in said group; responsive to said scanning, sending a signal group characteristic of the position of a respective individually scanned bit and a signal characteristic of whether further bits of said information are contained in said group.

Figure 2:
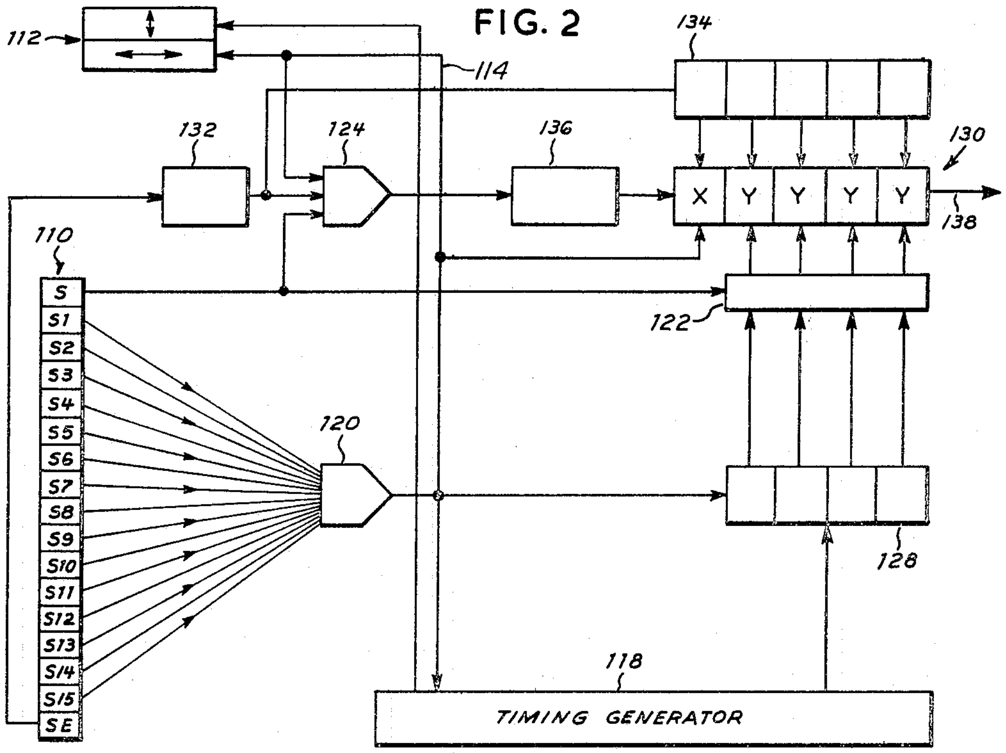
Figure 1:
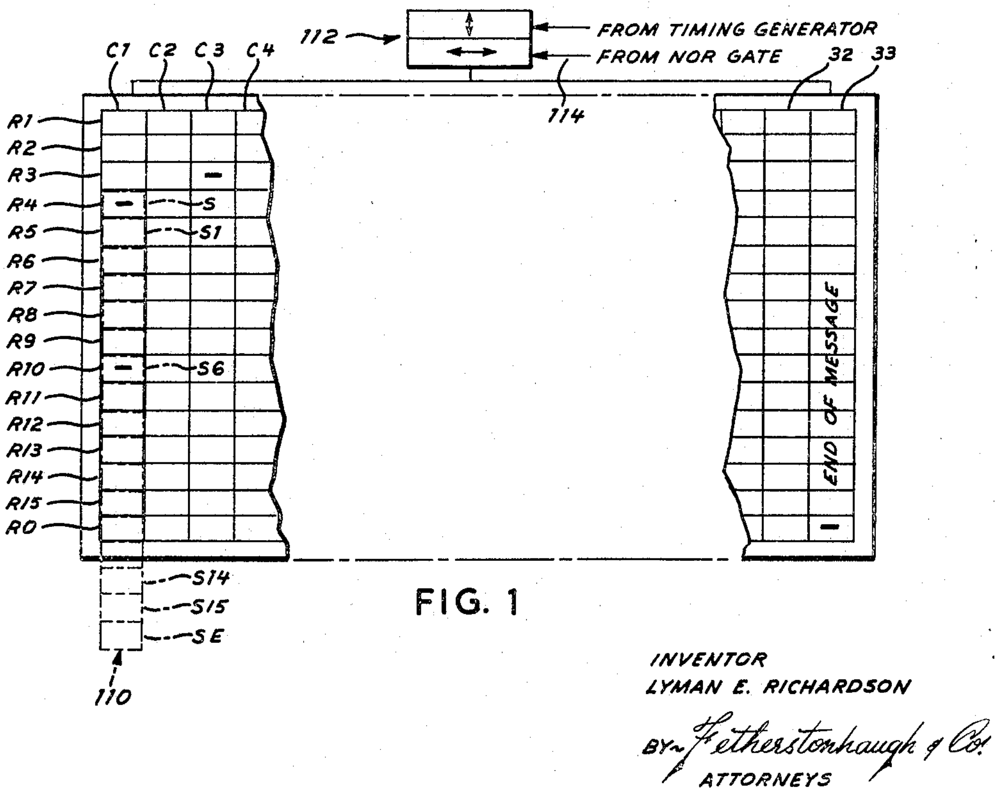

An embodiment of the invention will now be described, by way of example, with reference to the accompanying drawings in which:

FIGURE 1 is a diagrammatic representation of a card with the information shown in binary form (i.e. the information is conveyed by the presence or absence of a mark at predetermined locations), but wherein the corresponding information, which might appear on the card, in printed form is omitted; and FIGURE 2 shows in schematic form means for encoding binary information from the card.

The invention is also applicable, as will be more clearly seen hereinafter, to bits of information in binary form in any arrangement where they may, without loss of information, be considered as a plurality of groups of such bits wherein the groups may be sent in a predetermined order (referred to herein as a first predetermined order) and wherein the bits of information in said groups may be sent in a predetermined order (referred to herein as a second predetermined order).

As may be seen in FIGURE 1, bits of information in binary form arranged or arrangeable in rows or columns may be defined for transmission in physical encoded forms by one co-ordinate defining the column (which will be called the X co-ordinate) indicative of the column and one co-ordinate defining the row (which will be called the Y co-ordinate) and this is the method presently in use. Such method has the disadvantage that a large number of bits are, in the encoded form, required to portray the desired information. For example, with a card of the type of FIGURE 1 the 32 columns (the 33rd column is used here to signal end of message) and 16 rows indicated, require 2 decimal characters for the X co-ordinate and two decimal characters for the Y co-ordinate. However, the decimal system is seldom suitable for the transmission of information in physical form. In binary transmission form the 32 columns and 16 rows will require 5 binary bits (either mark or space) for the X co-ordinate and 4 binary bits (either mark or space) for the Y co-ordinate, a total of 9.

The described embodiment of the invention provides a method whereby with information arranged in binary form, in columns, the columns are scanned column by column in a first predetermined order and the presence of bits in a column of a selected one of the two binary forms (i.e. either "mark" or "space") is encoded in physical binary form (again "mark" or "space") (a) indicative of the Y co-ordinate of such one form (the Y co-ordinate being, in this discussion, indicative of the position of the bit of selected form in the column) and (b) indicative of whether all the bits of such one type in such column have been encoded. When information indicative of the presence of all of such one form in a column have been encoded, the results of scanning the next column selected in a predetermined sequence, are similarly encoded, and the same procedure followed within the column and the procedure continued until all the columns are scanned. It will be realized that the column may be scanned simultaneously or sequentially, but the encoded information must be transmitted in definite sequence for use by a receiver designed to operate in accord with the same sequence, since columns are not identified except to the extent that a binary signal indicates whether a Y co-ordinate is from the same column as the previous Y co-ordinate, or a different one.

Such encoded information, in transmissible binary form, may be provided following a start signal, and with precise intervals for transmission, is sufficient to actuate a receiving device: (a) operating in the same sequence and (b) moving from column to column in accord with the information, as it occurs, that all the bits of said one binary form in a column have been sent; to record or reproduce the original information.

(It will be realized that the terms "columns" and "rows" are used for explanation only and that these terms are interchangeable in the sense that it would be equally possible to treat "rows" as extending in the Y direction and scan by rows with the Y co-ordinate indicating the position relative to one end of a row.) In fact, the novel method is operable with a series of bits of information divisible into groups and arrangeable (without loss of information) (although not actually arranged) as rows and columns. (Whether "arranged" or "arrangeable" in columns and rows it should be noted that it is not essential to the inventive method that the same number of information bits appear in each column.)

In this way it will be noted, with the described method, the X co-ordinate of a bit position may be omitted and that corresponding to each Y co-ordinate, it is only necessary to send one "bit" indicative of whether the next Y co-ordinate will be from the same or the next column (or group) as the previous one. In this way, with binary transmission, the information for a position of a bit of information of FIGURE 1 may be transmitted by 5 bits of binary information instead of 9 and in general a material saving of transmission time for a given message may be achieved. Moreover, it will be noted that by adding one digit to a message, the size of the matrix and/or the number of individual messages may be doubled. Thus with the present card shown in the preferred embodiment 16×32=512 messages may be sent by 5 binary digits, the 16 representing the number of rows. By adding a further digit to produce a six digit message, a card having 32 rows may be conveyed, whereby 1024 individual messages may be sent merely by the addition of one digit to the message. The discussion of this advantage should not obscure the fact that messages of a given number of digits may be made to carry any number of individual messages without increase in the number of digits by increasing the number of columns.

It is an object of this invention to provide a method of encoding of information, whereby a saving in transmission time will be achieved.

In the drawings is shown a card having a plurality of columns (say 32) (designated by C and the column number) and wherein each column has a plurality of rows (say 16) (designated by R and the row number). It will be apparent from the description to follow, that it is not essential that each column have the same number of information positions, although it will be seen that with the means used in the specific embodiment, it is essential that each information position be equally spaced.

Each information position on the card is capable of being placed in one of two binary states. In the preferred embodiment the states are represented by a pencil line or the lack of it, the mark being such that it is electrically conducting and hence the existence or not of a mark in an information position may be ascertained by applying electrically energized probes to spaced locations on the potential line location to ascertain by conductivity whether the line is there or not.

The various columns and rows will be used to convey information, for example, a certain number of columns might represent the destination of a message, a certain number of columns might designate a train departure time, the date, and other information in connection with a train reservation.

The information once encoded in binary form could be used to convey a request for a reservation, to a central control, which could then reply as to the availability of the reservation. There are many other uses for information of this type. It could be used for accounting reports, or for ordering a commodity, such as shoes, where the various columns would represent size, width, style and so forth.

The lowest row on the card, designated R0 is used (in the preferred embodiment) solely to indicate the end of the message. Thus it is contemplated that in column C33 row R0 a "mark" will be located as such and printed as part of the card or simulated as a built-in feature to ensure that an "end of message" signal is sent. Moreover, it is contemplated that in the R0 position of any column which is to the right (i.e. on the higher column number side) of all the information on the card, a mark may be placed, indicating that there is no more information to be scanned. Thus by placing a mark after the last column in a card containing specific information, the length of the overall message may be shortened by eliminating the scanning of empty columns. Thus transmission time, in these situations, may be further shortened. It will be understood that columns can be scanned upwardly instead of downwardly (with consequent rearrangement of information) and that the order of scanning columns may be from right to left, and in the latter event the end of message signal will be in the column to the left of the last piece of conventional information or in a column to the left of that.

The preferred embodiment deals with the method of encoding the message, it being understood that once encoded, the message may be decoded or used in any one of a number of well known methods, to extract the information contained therein.

In FIGURE 2 is shown a schematic drawing of the preferred encoding means wherein a scanner 110 is provided having seventeen scanning positions geometrically arranged to correspond to the 16 information locations, R1, R2, etc., R15, R0 in a column of the card.

In the drawings, it will be noted that the last row is numbered R0 and is used for a purpose to be hereinafter discussed.

There is provided a register indicated schematically at 112 which may be considered to move in steps to move the card from right to left under the scanner or from the lower position to upper in steps corresponding to the rows under a particular location on the scanner. It should here be explained that it is only relative movement of scanner and card which is important, hence the card may move and the scanner be stationary or vice versa; moreover the relative movement may be mechanical as indicated or can, if desired, be simulated electronically; all within the scope of the invention. Movement of the register 112 (and hence the card) from right to left (i.e. from column to column) is controlled by a scanner pulse on line 114 and it will be understood that in accord with well known means, the card may be moved one column to the left on receipt of each pulse on line 114. A timing generator 118 supplies pulses to step the register 112 upwardly relative to the scanner 110 to bring successive row positions under the scanner. The scanner is provided with seventeen positions each having conductivity probes (not shown) and fifteen of these corresponding to the rows R1 to R15 are wired to the inputs of a NOR gate 120 arranged to put out a "mark" signal when none of the fifteen positions S1 to S15 is over a line on the card but otherwise to send a "space" indication. The first or primary scanner position S is an additional position geometrically one space above S1 and provided with conductivity probes and is connected to the control terminal of a gate 122 and also to an OR gate 124. Scanner position SE is located geometrically one position below S15 and position SE is connected to a block 132 to be discussed hereafter. The timing generator 118 is also connected to a four stage counter 128 which may be reset at its control terminal by the output of the NOR gate 120. The four stage counter 128 corresponds in binary digits to the scope of the sixteen rows on the card which allows it to portray in the binary code all the numbers from 0000 to 1111, a scope of sixteen numbers, and allows the counter 128, therefore, to portray any of the sixteen positions in a column. The four outputs of the four stage counter 128 are connected to form the input of gate 122. The NOR gate 120 is connected, with "space" signalled on all inputs, to supply: a reset pulse to the four stage counter 128, a column pulse (the X co-ordinate) to the first of the five message blocks 130, and to actuate (at register 112) a column shift of the card relative to the scanner. The signalling of "space" to all inputs of NOR gate 120 is achieved when none of the other scanning positions R1 to R15 overlies a mark on the card.

The remaining four message blocks are provided with input signals by, and correspond to four stages of, the four stage counter 128.

The OR gate 124 is connected to receive: the column pulse resulting from all 0 (or "space") inputs to NOR gate 120; a pulse from means 132 for determining the end of scanning a card; or a pulse resulting from a line on the card being located under scanning position S.

The means 132 is connected to receive a signal from scanner position SE when it encounters a special mark on the card in one of a number of well known methods to supply a pulse to the OR gate when all the marks on the card have been encoded.

The pulse output of means 132 is also connected to an end of message code release means 134, adapted on receipt of such pulse, to provide to message block 130 a binary message indicating "end of message." Such binary message in the preferred embodiment might be 01111 since this is a message which would not be transmitted during the scanning of a card.

The output of OR gate 124 is connected to a "send message" means 136, hence a "mark" signal at any input to OR gate 124 will result in a signal to block 136. Block 136 represents means, actuable, on receipt of such signal, to release message block 130 to output line 138.

For better explaining the operation, the scanner 110 is superimposed, in dotted lines, on the card shown in FIGURE 1. The relative positions of scanner and card shown in the figure would occur when the encoding was in progress. Before the scanning commences, in the "start" position, the relative positions of scanner and card will have the scanner 110 over column C1 on the card and with scanner position S1 over card position R1, scanner position S2 over card position R2 and so on. Thus in this position scanner position S will be one position above R1 and scanner position SE will be over row R0.

In operation it will be understood that the encoding means shown for providing an output signal on line 138, is one of many connected to lines to a central control. Accordingly, on notification to the encoding system shown, that it is desired to send a message and with the card in place in the register 112, the start pulse is provided. The card will already have been positioned, as will hereafter be seen, to start with the probes of scanner 110 located over column C1 and with position S1 located over row R1; position S2 over row R2 and so on. It will also be noted that the card is assumed to be marked at positions R4 and R10 of Column One, unmarked in column C2 and marked at position R3 in column C3. Means are built into the device for sending a "start" signal where a card is inserted in the register. On the receipt of a signal to transmit, usually originating from the control centre, that transmission is in order, the device is designed to commence transmission in accord with design techniques well known to those skilled in the art. As will be hereafter described, the four stage counter 128 will be set to 0000 and the message "00000" will exist in the message block 130. With the card in the "start" position of column 1, S1 over R1, S2 over R2 and so on, the "wired in" start signal "00000" will be sent, and this may be done in any number of ways available to those skilled in the art. At the same time the lines at positions C1–R4 and C1–R10 on the card will send pulses on inputs S4 and S10 to the NOR gate 120 and either of these would act, and do act, to prevent the NOR gate from providing an output pulse. Thereafter, under the pulses from the timing generator 118 to register 112, the column C1 of the card steps up under the position S and, as positions R1, R2 and R3 of the column are passed, the four stage counter progressively indicates these positions, but no message is sent to the message block 130 since the absence of a pulse from position S in these positions prevents passage of the counter indication through the gate 122. When position R4 in column C1 arrives under the scanner position S, a pulse from this position opens the gate 122 and sends the setting of the four stage counter (0100) to indicate position R4 to set the four "Y co-ordinate" stages of the message block 130. Since position 10 in column C1 is still activating one of the inputs to the NOR gate 120 (at this time from position S6 of the scanner) no pulse is emitted from the NOR gate 122. The relative positions of scanner 110 and card are indicated by the dotted lining on FIGURE 1.

As a result of the pulse from position S (resulting from the line at C1–R4) to the gate 122, the counter setting "0100" is set on the four right hand message blocks and as a result of the pulse from position S to OR gate 124, "send message" block 136 is activated to cause block 130 to send the message "00100" along line 138, according to position 4 it being realized that the left hand message block is 0 during all these messages, having been unchanged from its original setting. As positions 5 to 9 move under the scanner position S, in a predetermined sequence, no pulse is emitted therefrom and hence the gate 122 does not pass the counter 128 setting, although the counter setting rises in accord with the position of the card relative to the scanner 110. During this period no pulse is emitted from the NOR gate 120 because of the mark existing at position C1–R10 on the card which has not yet been moved to the S position and is therefore inhibiting the output pulse from NOR gate 120. (The no-pulse output condition is, therefore, effectively an impeding signal.) When the position C1–R10 on the card arrives under position S a pulse is set as before to pass through gate 122, the counter setting indicating R10 (1010) but at the same time a signal is now emitted from the NOR gate 120 because there are now no lines on the card corresponding to any of positions S1 to S15 to cause a pulse signal to the NOR gate. The consequent output also emitted from the NOR gate is effective to cause the register to move the card one position to the left to bring column C2 under the scanner and at the same time, through the input to register 112 to move the scanner 110 so that position C2–R1 is under position S1, C2–R2 is under position S2, and so on and further to activate the left hand message block 130, to change the setting from 0 to 1 (i.e. from a signal of one type to signal of another type) and, further, to reset the four stage counter 128 to 0000. At the same time the OR gate 124, on receipt of the pulse either from the NOR gate 120 or position S causes the message 11010 to be sent on line 138. It will be appreciated that the 1 in the left hand position of the message will be utilized on reception of the message to indicate to the transcribing means that the Y co-ordinate sent next will be from the succeeding column. As soon as the next column C2 is moved under scanner 110, it being noted that there are no marks in the column, the output of the NOR gate will be "mark" (since there are no lines in column C2 to supply inputs to the NOR gate) setting to 1 (or "mark") the X position of block 130, setting the scanner over the third column C3 and through the OR gate 124 sending the message 100000 indicative of the fact that there are no lines in the second column of the card. In the third column C3 with a line in position C3–R3, the X block is initially set at 0 and the card will move up until position C3–R3 is under the scanner position S, at which time the four stage counter 128 will be set to 0011.

This message will be allowed through the gate 122 to the four right hand stages of message block 130. With the line at C3–R3 under position S there are no further lines in column C3 to activate NOR gate 120 and the consequent output pulse therefrom to the left hand stage of block 130 will set the binary state therein at 1. The output from S scanner position to block 136 will cause the message 10011 to be sent. The output of NOR gate 120 will shift column C4 under the scanner while the mark in the left hand position of the message will tell the receiver that the next message will relate to the fourth column.

After each mark from NOR gate 120 the four stage counter 128 is reset to 0.

When all the information in the 32 columns has been scanned in the above manner, block 132 is actuated. Such actuation may be provided either at the location C33–R0 where a "mark" is located either as a mark on the card or simulated by a built-in feature of the device; or at a lower column number in row R0 placed by the "marker" of the card to indicate that the columns to the left of the column so marked contain all the information on the card.

Under either alternative method, the actuation of block 132 will cause a signal from the block to be applied to the "end of message" block 134 and through OR gate 124 and "send" block 136 to send the "end of message" message 01111 being a message which is not required for the normal messages. At the same time the end of message signal for block 132 is used to reset scanner 110 over the first column position ready for repetition of the procedure described on the next card.

It will be obvious that means of a wide variety of designs may be provided to initiate decoding on receipt of the encoded messages wherein on receipt of a "start of message" message marks for the first column are printed in accord with the Y co-ordinates up to the point where the receipt of an X co-ordinate of 1 indicates a change of column, whereupon the same procedure would be repeated for the second column but where there are no marks hence the X co-ordinate again indicates movement to the third column. Hence from the information encoded in the inventive manner, the information may be decoded in any of the desired manner at the reception end.

It should also be noted that the described system is one which provides for sending progressively increasing binary numbers relating to successive marks in a column; thus an error check may be provided by passing successive signals from a column through circuitry designed to provide an error signal if successive signals are not increasing binary numbers, such circuitry of course being designed to be reset at the end of each column.

It will be obvious that many methods of scanning are available and that the invention is not limited to the method shown. Without limiting the scope of the scanning available it will be obvious that the card may be stationary and the scanner move. Alternatively, relative movement may be simulated electronically. It will also be obvious that the information need not be arranged in matrix form of rows and columns as long as it is arrangeable in this manner. By this is meant, the information may be in any form arrangeable in rows and columns, thus plurality of information which could be defined by two co-ordinates may in accord with this invention be defined by starting at a predetermined value of one co-ordinate indicating the values of the other co-ordinate corresponding thereto, indicating when the first mentioned co-ordinate should be increased by one indicating the values of the other co-ordinate corresponding thereto, and so on.

I claim:

1. Apparatus for encoding information for transmission over a channel to a receiver, the information being tabulated in physical form in selectable locations in one or more groups of an information carrier including:

(a) first scanning means for individually scanning the selectable locations in a group in a predetermined sequence to locate, in turn, each bit of information therein;

(b) second scanning means for simultaneously scanning all the selectable locations following that location in the same group which is being scanned in said predetermined sequence to determine whether there is a further bit of said information in said group;

(c) means, responsive to said first and second scanning means, for sending a signal group characteristic of the position of a respective individually scanned bit and a signal characteristic of whether further bits of said information are contained in said group, whereby when there is no further bit in said same group then the relative position of said information carrier is advanced whereby the next group is scanned;

(d) means for controlling a counter to commence counting at the commencement of the scanning of said group by said first scanning means;

(e) gate means connected between said counter and message-transmitting means; and (f) said first scanning means being operative on its location of a bit of information in said group to open said gate to permit passage therethrough to said message-transmitting means of the corresponding count in said counter in the form of said signal group.

2. Apparatus for encoding information for transmission over a channel to a receiver, the information being tabulated in selectable locations in one or more columns of an information carrier including:

(a) first scanning means for individually scanning said selectable locations in a column in a predetermined sequence to locate, in turn, each bit of information therein;

(b) second scanning means for simultaneously scanning all the selectable locations following that location in the same column which is being scanned in said predetermined sequence to determine whether there is a further bit of said information in said column;

(c) means, responsive to said first and second scanning means, for sending a signal group characteristic of the position of a respective individually scanned bit and a signal characteristic of whether further bits of said information are contained in said column, whereby when there is no further bit in said same column then the relative position of said information carrier is advanced whereby the next column is scanned;

(d) means for controlling a counter to commence counting at the commencement of the scanning of said column by said first scanning means;

(e) gate means connected between said counter and message-transmitting means; and (f) said first scanning means being operative on its location of a bit of information in said column to open said gate to permit passage therethrough to said message-transmitting means of the corresponding count in said counter in the form of said signal column.

3. Apparatus according to claim 2 wherein said message-transmitting means is capable of transmitting a one-digit signal indicative of the column being scanned.

4. Apparatus according to claim 2 wherein said message-transmitting means is also provided with a signal of one type by said second scanning means when a further bit of said information is present in the same column as the respective individually scanned bit and a signal of another type when there is no further bit of information in the same column and thus indicative that the next signal group passed through said gate will be representative of a bit of information in another column.

5. Apparatus according to claim 4 including a send-message control means to cause said message-transmitting means to transmit said signal group and said signal over said channel to said receiver in serial form.

6. Apparatus according to claim 2 including means for providing a start signal indicative of the commencement of scanning and of the start of a message.

7. Apparatus according to claim 4 including means for providing a start signal indicative of the commencement of scanning and of the start of a message.

8. Apparatus according to claim 2 including means for providing an end-of-message signal when the last group or column containing a bit of information has been scanned 9. Apparatus according to claim 4 including means for providing an end-of-message signal when the last group or column containing a bit of information has been scanned.

10. Apparatus for encoding binary information for transmission over a channel to a receiver, the information being arranged as separate bits of information in selectable locations in a number of columns or rows on a card or other information carrier, which apparatus comprises a scanner, arranged to individually scan said selectable locations in each column or row in a predetermined sequence so as to locate therein the first bit of information (if such exists in the column or row) and to determine whether there is a further bit of information in said column or row, the scanner having a primary scanning section which is connected to a gate interposed between a counter and message-transmitting means so as to send a signal to the gate as each bit of information is located by the primary scanning section to open said gate to permit passage therethrough of the corresponding count in said counter identifying the position of the respective bit of information, and having a number of other scanning sections which are connected to a NOR gate so as to send an impeding signal thereto until such time as all bits of information in the column or row have been located by the primary scanning section, the counter being connected to the NOR gate so as to receive a resetting signal therefrom when cessation of the impeding signal to the NOR gate indicates that there are no bits of information or no further bits of information in the column or row.

11. Apparatus according to claim 10 in which the scanning sections of the scanner are each provided with electrical conductivity probes designed to send signals in the form of electrical pulses.

12. Apparatus according to claim 10 in which registering means are provided for effecting relative movement between the scanner and the information carrier so that the columns or rows on the information carrier can be scanned in turn for bits of information contained in them.

13. Apparatus according to claim 11 in which registering means are provided for effecting relative movement between the scanner and the information carrier so that the columns or rows on the information carrier can be scanned in turn for bits of information contained in them.

14. Apparatus according to claim 12 in which the scanning of each column or row is controlled by a timing generator which is arranged to send a signal to the registering means so that each portion of each column or row is scanned successively for bits of information contained therein.

15. Apparatus according to claim 13 in which the scanning of each column or row is controlled by a timing generator which is arranged to send a signal to the registering means so that each portion of each column or row is scanned successively for bits of information contained therein.

16. Apparatus according to claim 12 in which relative movement between the scanner and the information carrier for the purpose of scanning a different row or column after a row or column has been scanned is controlled by the NOR gate which is arranged to send a signal to the registering means when cessation of the impeding signal to the NOR gate occurs.

17. Apparatus according to claim 15 in which relative movement between the scanner and the information carrier for the purpose of scanning a different row or column after a row or column has been scanned is controlled by the NOR gate which is arranged to send a signal to the registering means when cessation of the impeding signal to the NOR gate occurs.

18. Apparatus according to claim 10 in which the NOR gate is arranged to send a signal to the message-transmitting means when cessation of the impeding signal to the NOR gate occurs.

19. Apparatus according to claim 13 in which the NOR gate is arranged to send a signal to the message-transmitting means when cessation of the impeding signal to the NOR gate occurs.

20. Apparatus according to claim 17 in which the NOR gate is arranged to send a signal to the message-transmitting means when cessation of the impeding signal to the NOR gate occurs.

21. Apparatus according to claim 10 in which the NOR gate is arranged to send a signal to an OR gate when cessation of the impeding signal to the NOR gate occurs, the OR gate being arranged to receive also a signal from one of the scanning sections of the scanner when all the columns or rows on the information carrier have been scanned.

22. Apparatus according to claim 13 in which the NOR gate is arranged to send a signal to an OR gate when cessation of the impeding signal to the NOR gate occurs, the OR gate being arranged to receive also a signal from one of the scanning sections of the scanner when all the columns or rows on the information carrier have been scanned.

23. Apparatus according to claim 17 in which the NOR gate is arranged to send a signal to an OR gate when cessation of the impeding signal to the NOR gate occurs, the OR gate being arranged to receive also a signal from one of the scanning sections of the scanner when all the columns or rows on the information carrier have been scanned.

24. Apparatus according to claim 23 in which means are provided by which the signal received by the OR gate from the said scanning section when all the columns or rows on the information carrier have been scanned is also supplied to message code release means which are arranged to send an end-of-message signal to the message transmitting means.

References Cited

UNITED STATES PATENTS

| | | |
|---|---|---|
| 3,201,512 | 8/1965 | Mason et al. |
| 3,211,470 | 10/1965 | Wilson. |
| 3,335,408 | 8/1967 | Oliver. |

OTHER REFERENCES

Edgington et al.: "Curve Reader and Converter," IBM Technical Disclosure Bulletin, vol. 3, No. 11, April 191, pages 55 and 56.

Grob: "Basic Television, Principles and Services," 2nd edition, 1954, McGraw-Hill Book Co., pages 19 and 20.

MAYNARD R. WILBUR, Primary Examiner

T. J. SLOYAN, Assistant Examiner

U.S. Cl. X.R.

340—354